July 12, 1932.     R. K. LEE     1,867,364
STEERING MECHANISM
Filed Dec. 14, 1927
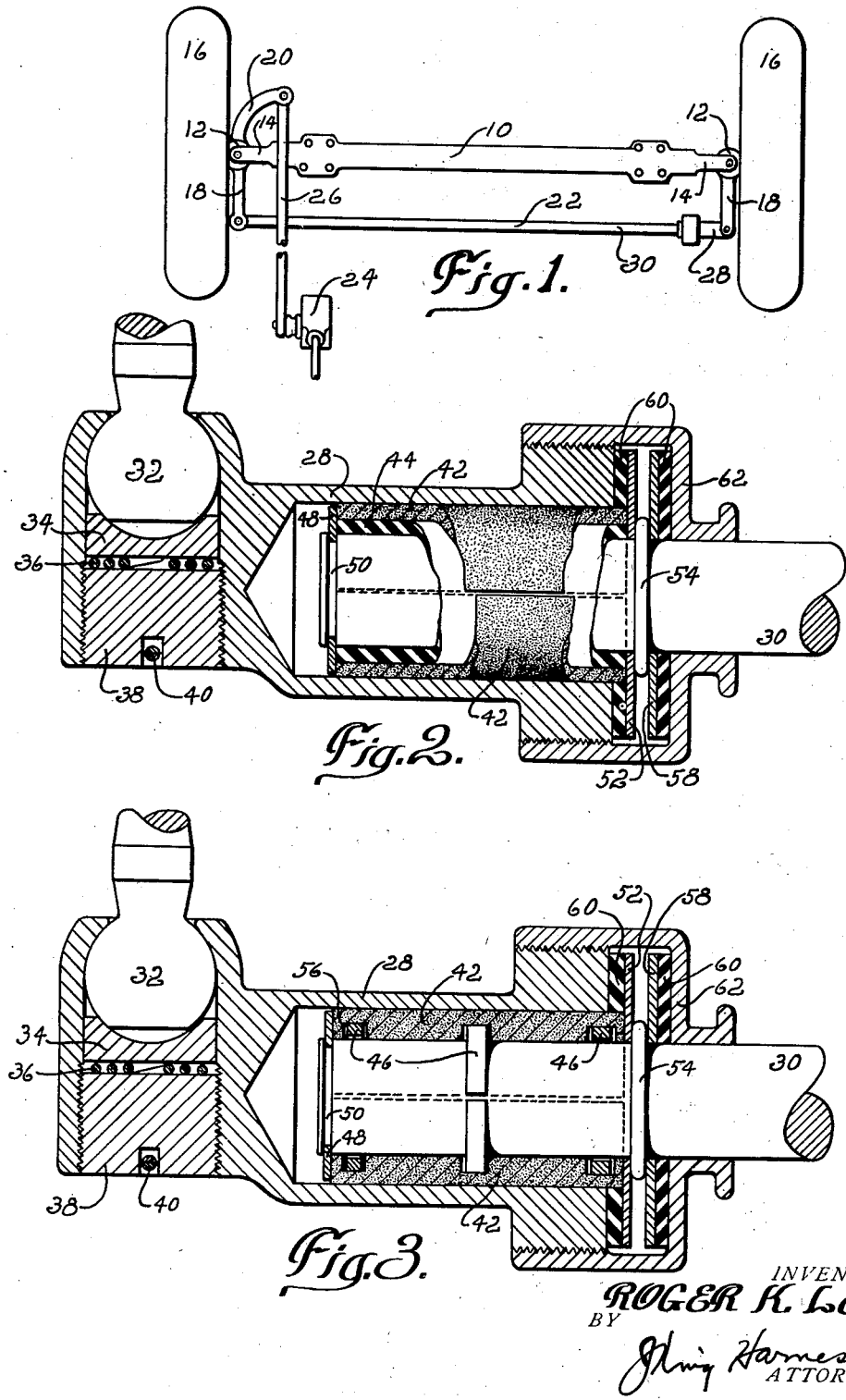
INVENTOR
ROGER K. LEE.
BY
Jling Harness
ATTORNEY Patented July 12, 1932

1,867,364

UNITED STATES PATENT OFFICE

ROGER K. LEE, OF DETROIT, MICHIGAN, ASSIGNOR TO CHRYSLER CORPORATION, OF DETROIT, MICHIGAN, A CORPORATION OF DELAWARE

STEERING MECHANISM

Application filed December 14, 1927. Serial No. 239,839.

This invention relates to steering mechanism and more particularly to a tie rod connection between a pair of pivoted steering knuckles, embodying a means for eliminating synchronous wheel vibration commonly called "wheel shimmy".

Heretofore the front wheels of a vehicle have been connected together by a rigid tie rod so that the vibration of one wheel is transmitted to the other wheel causing vibration of both wheels to synchronize.

It is an object of this invention to provide means for preventing synchronous vibration by breaking up the vibration periods so that in the event that one wheel vibrates the other wheel may not vibrate in phase with it. The present invention contemplates resisting the vibration of each wheel by providing a connection which permits independent movement of the wheels and providing frictional means for resisting or retarding that movement.

Another object is to provide a simple, inexpensive and practical means for accomplishing the above objects without alteration of the steering mechanism other than by its connecting link, and which may be readily applied to the steering mechanism of a vehicle after it has been manufactured.

The above and other objects of the invention will more fully appear from the following description taken in connection with the accompanying drawing in which:

Fig. 1 is a plan view of a part of the steering mechanism of a vehihcle which is provided with an embodiment of my invention.

Fig. 2 is an enlarged sectional view showing in detail the application of a friction device between the moving parts of the connecting link.

Fig. 3 is a view corresponding to Fig. 2 but showing a modified form of my invention.

Referring to the illustrated embodiment of my invention and particularly to Fig. 1, the reference numeral 10 designates the front axle of an autotmobile provided with steering knuckles 12 pivoted in yokes 14 at the opposite ends of the axle. Wheels 16 are mounted on spindles carried by the knuckles 12. Projecting arms 18 and 20 are secured to the knuckles 12 and a tie rod 22 is adapted to have its opposite ends pivotally connected to the arms 18.

The actuating member or steering gear is illustrated as at 24 and a drag link 26 forms an operative connection between the actuating member and the arm 20 of the knuckle. Longitudinal movement of the drag link 26 causes angular movement of the one knuckle and it in turn causes angular movement of the other knuckle thru the tie rod 22.

The tie rod 22 has been formed from two parts—a connecting end portion 28 and a rod 30. The two parts are interconnected but free for limited independent movement relative to each other. The end portion 28 is shown adapted to receive a ball 32 on the end of the arm 18. The ball is held in place by a wear member 34 which is resiliently held against the ball by a spring 36. A nut 38, screwthreaded in the portion 28, forms an adjustable abutment for the spring 36 and the pin 40 locks the nut 38 in position.

The inner end of the portion 28 is formed tubular and is adapted to receive the inner end of the rod 30. A resisting member in the form of a pair of semicylindrical members 42, of suitable friction material, is positioned between the rod 30 and portion 28, engaging the inner periphery of the tubular end portion. Between the members 42 and the rod 30 is a resilient member, shown as a rubber cylinder 44 in Fig. 2 and as a plurality of split spring rings 46 in Fig. 3, adapted to urge the semicylindrical members 42 radially against the inner periphery of the tubular end portion. The members 42 and resilient member 44 are secured to the rod 30 to move axially therewith. A washer 48, received in a groove 50 in the end of the rod 30, holds the members 42 and 44 in one direction on the rod and a washer 52 engaging an annular flange 54 holds the members 42 and 44 in the opposite direction. In the form shown in Fig. 3 the resilient rings 46 are carried in annular grooves 56 in the resisting member 42 indirectly supported on the rod 30 between the two washers 48 and 52.

At the opposite side of the flange 54 is another washer 58 which together with the washer 52 form an annular projecting limiting the axial movement of the rod 30. Resilient means such as rubber washers 60 are positioned on opposite sides of the projecting members, one engaging the end of the tubular end portion and the other engaging a cap 62, screwthreaded on the tubular portion 28.

Thus it will be understood that a two part tie rod has been provided in which one part may move independent of the other, resilient means has been provided for limiting or resisting the relative movement, and friction means has been provided for retarding the relative movement. By the use of such a construction one wheel may vibrate without effecting the vibration of the other wheel and they do not synchronize due to the retarded movement of one against the other.

It will be obvious that various changes may be made in the arrangement, combination and construction of the various parts of my improved device without departing from the spirit of my invention and it is not my intention to limit its scope other than by the terms of the appended claims.

What I claim is:

1. A connection of the class described comprising a tubular end portion, a removable cap having an opening in axial alignment with the tubular end portion and spaced from the end thereof, a rod axially movable in the opening in said cap and the tubular end portion, means on said rod frictionally engaging said tubular end portion, a radial flange on said rod projecting radially in the radial recess formed by the spaced cap and the end of the tubular member, and a rubber disk at the opposite faces of said flange between said flange and the end of the tubular member and between the flange and the inner face of said cap.

2. A connection of the class described comprising a tubular end portion, a removable cap having an opening in axial alignment with the tubular end portion and spaced from the end thereof, a rod axially movable in the opening in said cap and the tubular end portion, a radial flange at the end of said rod, another flange on said rod spaced from said first mentioned flange, friction material between said flanges in frictional engagement with the inner periphery of said tubular end portion, resilient means for urging said friction material radially outwardly into frictional engagement with said tubular end portion, said second named flange projecting radially into the radial recess formed by the spaced cap and the end of the tubular member, and a rubber disk at the opposite faces of said flange between said flange and the end of the tubular member and between the flange and the inner face of said cap.

3. A connection of the class described comprising a tubular member, a rod within said tubular member, a pair of spaced rubber washers carried in a radial recess in said tubular member, a flange on said rod between said washers, a rubber cylinder around said rod, and two semi-cylindrical friction members around said rubber cylinder in frictional engagement with the inner periphery of said tubular member, said rubber cylinder being under compression and movable axially with said rod and friction members.

4. A connection of the class described comprising a tubular member, an end wall on said tubular member having an aperture therein, a rod extending through said aperture and having an end portion located in said tubular member, spaced radial flanges on said rod between the inner extremity thereof and the end wall of said tubular member, a frictional cylindrical member between said flanges and in frictional engagement with the inner periphery of said tubular member, resilient means between said rod and said frictional member urging the latter outwardly, and resilient means between one of said flanges and said end wall for limiting the axial movement of said rod relative to said tubular member.

ROGER K. LEE.